United States Patent
Sheynblat et al.

(10) Patent No.: US 9,746,945 B2
(45) Date of Patent: Aug. 29, 2017

(54) INTEGRATING SENSATION FUNCTIONALITIES INTO A MOBILE DEVICE USING A HAPTIC SLEEVE

(75) Inventors: Leonid Sheynblat, Hillsborough, CA (US); Vinay Sridhara, Santa Clara, CA (US); Saumitra Mohan Das, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 272 days.

(21) Appl. No.: 13/594,305

(22) Filed: Aug. 24, 2012

(65) Prior Publication Data

US 2013/0222280 A1     Aug. 29, 2013

Related U.S. Application Data

(60) Provisional application No. 61/577,615, filed on Dec. 19, 2011.

(51) Int. Cl.
    *G06F 3/041*     (2006.01)
    *G06F 3/01*     (2006.01)

(52) U.S. Cl.
    CPC .............. *G06F 3/041* (2013.01); *G06F 3/016* (2013.01); *G06F 3/0414* (2013.01); *G06F 2203/04809* (2013.01)

(58) Field of Classification Search
    CPC ........ G06F 3/041; G06F 3/016; G06F 3/0414; G06F 2203/04809

(Continued)

(56) References Cited

U.S. PATENT DOCUMENTS

| | | |
|---|---|---|
| 6,850,782 B2 | 2/2005 | Bright et al. |
| 7,769,417 B2 | 8/2010 | Tierling et al. |
| | (Continued) | |

FOREIGN PATENT DOCUMENTS

| | | |
|---|---|---|
| CN | 102156540 A | 8/2011 |
| CN | 102195514 A | 9/2011 |
| | (Continued) | |

OTHER PUBLICATIONS

International Search Report and Written Opinion—PCT/US2012/070178—ISA/EPO—Apr. 2, 2013.

*Primary Examiner* — Andrew Sasinowski
(74) *Attorney, Agent, or Firm* — MG-IP Law, P.C.

(57) ABSTRACT

Methods, apparatuses, systems, and computer-readable media for integrating sensation functionalities into a mobile device using a haptic sleeve are presented. According to one or more aspects of the disclosure, a computing device may receive, via a haptic sleeve, sensation input captured by one or more haptic components of the haptic sleeve. Subsequently, the computing device may store haptic data corresponding to the received sensation input. For example, in storing such haptic data, the computing device may store information describing one or more electrical signals received via the one or more haptic components of the haptic sleeve during a period of time corresponding to a particular event, and this stored information may reflect various characteristics of the sensation input received by the computing device in connection with the particular event, such as the magnitude(s), position(s), duration, and/or type(s) of sensation(s) captured during the period of time.

47 Claims, 9 Drawing Sheets

(58) Field of Classification Search
USPC .................................................. 345/173–177
See application file for complete search history.

(56) References Cited

U.S. PATENT DOCUMENTS

| 7,843,277 | B2* | 11/2010 | Gregorio et al. ............... 331/65 |
| 8,040,224 | B2 | 10/2011 | Hwang |
| 2009/0213066 | A1* | 8/2009 | Hardacker et al. ........... 345/156 |
| 2009/0322496 | A1 | 12/2009 | Da |
| 2010/0035665 | A1 | 2/2010 | Munson |
| 2010/0115455 | A1* | 5/2010 | Kim .................... G06F 3/04815 715/781 |
| 2010/0117809 | A1 | 5/2010 | Dai et al. |
| 2010/0141408 | A1 | 6/2010 | Doy et al. |
| 2010/0152794 | A1* | 6/2010 | Radivojevic et al. ............ 607/2 |
| 2011/0032088 | A1 | 2/2011 | Kim et al. |
| 2011/0072394 | A1* | 3/2011 | Victor .................... G06F 3/0482 715/821 |
| 2011/0193802 | A1* | 8/2011 | Park et al. ..................... 345/173 |
| 2011/0227822 | A1* | 9/2011 | Shai ...................... G06F 1/1615 345/156 |

FOREIGN PATENT DOCUMENTS

| CN | 102271755 | A | 12/2011 |
| EP | 1418491 | A2 | 5/2004 |
| EP | 2354901 | A1 | 8/2011 |
| JP | 2005332302 | A | 12/2005 |
| JP | 2011040067 | A | 2/2011 |
| WO | WO2011097020 | A2 | 8/2011 |

\* cited by examiner

| Example Haptic Data Corresponding to Deformation 620 ||||
|---|---|---|---|
| Position | Effect Type | Magnitude | Duration |
| (60.5, 140.2) | Deformation: Poke | 1.2 | 0.2 |
| (60.5, 140.2) | Deformation: Poke | 2.4 | 0.2 |
| (60.5, 140.2) | Deformation: Poke | 4.8 | 0.3 |
| (60.5, 140.2) | Deformation: Poke | 9.6 | 1.2 |
| (60.5, 140.2) | Deformation: Poke | 4.8 | 0.3 |
| (60.5, 140.2) | Deformation: Poke | 2.4 | 0.2 |
| (60.5, 140.2) | Deformation: Poke | 1.2 | 0.2 |

INTEGRATING SENSATION FUNCTIONALITIES INTO A MOBILE DEVICE USING A HAPTIC SLEEVE

CLAIM OF PRIORITY UNDER 35 U.S.C. §119

This application claims priority to U.S. Provisional Patent Application Ser. No. 61/577,615, filed Dec. 19, 2011, and entitled "Integrating Sensation Functionalities into a Mobile Device Using a Haptic Sleeve," which is incorporated by reference herein in its entirety for all purposes.

BACKGROUND

Aspects of the disclosure relate to computing technologies. In particular, aspects of the disclosure relate to mobile computing device technologies, such as systems, methods, apparatuses, and computer-readable media for integrating sensation functionalities into a mobile device using a haptic sleeve.

Currently, mobile devices, such as cellular phones, smart phones, tablet computers, and other mobile computing devices may provide only limited haptic functionalities, if they provide any haptic functionalities at all. For example, a mobile device may provide simple haptic feedback in limited circumstances (e.g., briefly vibrating to notify a user that a text message has been received or that a phone call is incoming), but may otherwise lack the software and/or hardware that might be needed to provide more sophisticated haptic effects. Additionally or alternatively, mobile devices may lack the components necessary to capture sensation input. For example, a mobile device might not include one or more sensors that would allow the mobile device to receive sensation input in the form of a deformation or protrusion, thermal effect, or the like. By implementing one or more aspects of the disclosure, enhanced functionality, improved flexibility, and greater convenience may be provided to users of mobile devices, for instance, by integrating sensation functionalities into a mobile device using a haptic sleeve.

SUMMARY

Systems, methods, apparatuses, and computer-readable media for integrating sensation functionalities into a mobile device using a haptic sleeve are presented. As noted above, current mobile devices, such as cellular phones, smart phones, tablet computers, and other mobile computing devices may provide only limited haptic functionalities. For example, a mobile device may provide simple haptic feedback in limited circumstances (e.g., briefly vibrating to notify a user that a text message has been received or that a phone call is incoming), but may otherwise lack the software and/or hardware that might be needed to provide more sophisticated haptic effects or capture sensation input. Aspects of the disclosure provide more convenient, effective, and easy-to-use ways of providing more sophisticated haptic feedback to and receiving sensation input from users of mobile devices using peripheral accessories, such as haptic sleeves.

According to one or more aspects of the disclosure, a haptic sleeve may be provided to enable and/or enhance the haptic functionalities of a mobile device. In one or more arrangements, such a haptic sleeve may be provided as a peripheral accessory to a mobile device that otherwise lacks the hardware and/or software that might be needed to reproduce certain haptic effects (e.g., texture sensations, pressure sensations, wetness sensations, adhesion sensations, thermal sensations, vibratory sensations, and/or any other effects that may be sensed by a person using his or her sense of touch) and/or capture sensation input. The sensation input may, for example, comprise one or more electrical signals, which are receivable and/or received by the mobile device and/or the haptic sleeve, and which describe and/or define tactile characteristics of an object or an event, such as a particular texture of a surface (e.g., the texture of a particular rug or piece of cloth contacting the haptic sleeve and/or one or more sensors included therein) or a particular deformation event (e.g., a deformation having a particular duration and magnitude that simulates a poking or tapping sensation). While these types of sensation input are discussed here as examples, other types of sensation input instead of and/or in addition to those discussed here can similarly be captured by a haptic sleeve.

As discussed in greater detail below, a haptic sleeve may include, for instance, one or more haptic components that allow the haptic sleeve to provide haptic feedback to a user as output and/or receive haptic data from a user as input, and may further include a data interface that allows the haptic sleeve to communicate with, draw power from, and/or be controlled by the mobile device. Additionally or alternatively, the haptic sleeve may be molded, shaped, stitched, assembled, and/or otherwise configured to physically engage with the mobile device. For instance, the haptic sleeve may be configured to clip on to and/or otherwise slide or fit around one or more sides and/or surfaces of the mobile device. Advantageously, these and other features described herein may provide enhanced functionality, flexibility, and convenience to users of mobile devices.

According to one or more aspects of the disclosure, a computing device, such as a smart phone, tablet computer, or other mobile device, may receive, via a haptic sleeve, sensation input captured by one or more haptic components of the haptic sleeve. Subsequently, the computing device may store haptic data corresponding to the received sensation input. For example, in storing such haptic data, the computing device may store information describing one or more electrical signals received via the one or more haptic components of the haptic sleeve during a period of time corresponding to a particular event, and this stored information may reflect various characteristics of the sensation input received by the computing device in connection with the particular event, such as the magnitude(s), position(s), duration, and/or type(s) of sensation(s) captured during the period of time.

In one or more arrangements, the computing device subsequently may cause the haptic data corresponding to the received sensation input to be sent to at least one recipient device. Additionally or alternatively, the haptic data may be configured to cause the at least one recipient device to provide haptic feedback based on the received sensation input.

In one or more additional and/or alternative arrangements, the computing device may cause the haptic data corresponding to the received sensation input to be sent to a recipient device, and the haptic data may be configured to cause the recipient device to provide haptic feedback based on the received sensation input via a second haptic sleeve communicatively coupled to the recipient device. In this manner, it may be possible for users to send and receive tactile communications and/or other haptic messages "sleeve to sleeve," or from one haptic sleeve to another.

In at least one arrangement, the haptic sleeve may comprise a contoured housing that includes the one or more haptic components and may be configured to engage with the computing device. Additionally or alternatively, the haptic sleeve may comprise an input/output interface that is configured to communicatively couple the haptic sleeve to the computing device.

In one or more additional and/or alternative arrangements, storing haptic data corresponding to the received sensation input may include storing at least one position value, at least one intensity value, and at least one duration value. These values may, for instance, represent one or more vectors describing sensation input received during a particular period of time.

In still one or more additional and/or alternative arrangements, the computing device may receive image data associated with the received sensation input. The computing device subsequently may store the received image data. In at least one arrangement, storing the received image data may include aligning the image data with the received sensation input and storing the aligned image data. In this manner, the computing device not only may capture how an object "looks" (e.g., by storing an image of the object), but also may capture how the object "feels" (e.g., by recording a texture of the object, potentially aligned with the image of the object).

In still one or more arrangements, storing haptic data corresponding to the received sensation input may include storing haptic data describing at least one non-vibratory sensation. A "non-vibratory" sensation may include any sensation that includes at least one effect that does not involve producing vibration.

In still one or more additional and/or alternative arrangements, the computing device may establish a connection with at least one recipient device, and subsequently may cause the haptic data corresponding to the received sensation input to be sent to the at least one recipient device. The computing device then may receive, via the haptic sleeve, additional sensation input captured by the one or more haptic components of the haptic sleeve. Thereafter, the computing device may stream, via the established connection, additional haptic data corresponding to the additional sensation input to the at least one recipient device. In this manner, it may be possible for users to send and receive tactile communications and/or other haptic messages to each other in real-time.

According to one or more additional aspects of the disclosure, a haptic sleeve may be provided. The haptic sleeve may include a contoured housing, one or more haptic components included in the contoured housing, and an input/output interface. The input/output interface may be configured to allow a computing device to actuate the one or more haptic components, and the contoured housing may be configured to engage with the computing device.

In one or more arrangements, the one or more haptic components are configured to provide haptic feedback to a user of the computing device. In one arrangement, the haptic feedback may include a poking sensation. In another arrangement, the haptic feedback may correspond to sensation input provided by a second user of a second computing device and received by a second haptic sleeve associated with the second computing device.

In one or more arrangements, the computing device may be a smart phone, and/or the input/output interface may be a Universal Serial Bus (USB) interface. In some arrangements, the contoured housing may be configured to form a hard plastic shell for at least one side of the computing device, while in other arrangements, the contoured housing may be configured to form a soft foam case for at least one side of the computing device. In at least one arrangement, the input/output interface may be further configured to allow the computing device to receive sensation input from the one or more haptic components.

According to one or more additional aspects of the disclosure, a device may be provided, and the device may include feedback means for providing haptic feedback, interface means for allowing a computing device to control the feedback means, and housing means for engaging with the computing device. In one or more arrangements, the housing means may house the feedback means and the interface means.

According to one or more additional aspects of the disclosure, a device, such as a haptic sleeve, may establish a data connection with a computing device. Subsequently, the device may receive haptic input from a user, and the device may send the haptic input to the computing device. In one or more arrangements, the data connection may be established via a USB interface and/or an APPLE iPod Dock connector interface. Additionally or alternatively, the computing device might not include components capable of receiving the haptic input.

In at least one arrangement, prior to establishing the data connection with the computing device, the device may physically engage with the computing device. In at least one additional or alternative arrangement, the device may receive one or more haptic commands from the computing device, and the device may provide one or more haptic sensations to the user based on the one or more received haptic commands. Additionally or alternatively, the device might not include components capable of providing the one or more haptic sensations.

According to one or more additional aspects of the disclosure, haptic input may be received at a first haptic sleeve, and haptic feedback corresponding to the haptic input may be provided at a second haptic sleeve. In at least one arrangement, the haptic input may be transmitted from the first haptic sleeve to the second haptic sleeve.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1A:
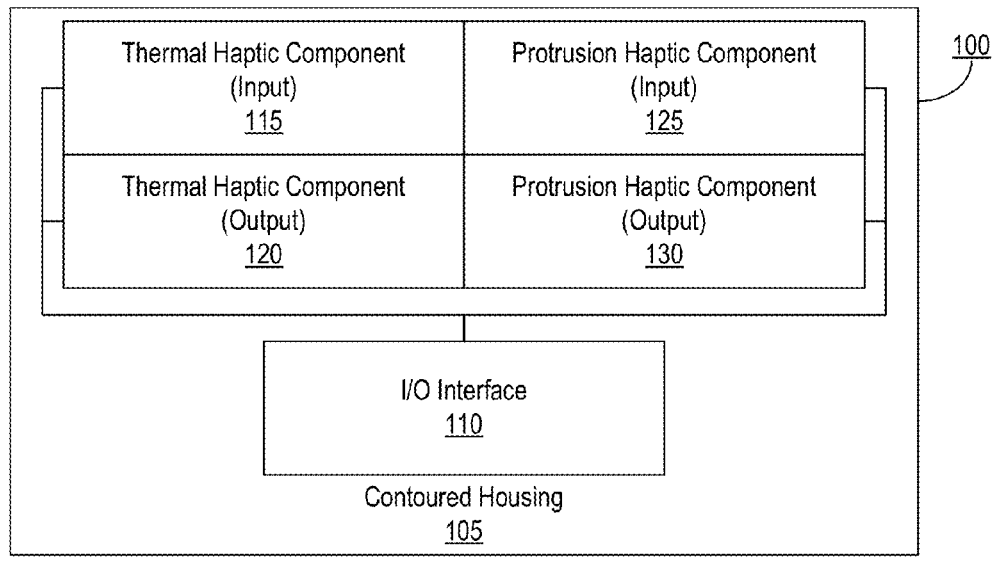
FIG. 1A illustrates an example of a haptic sleeve for integrating sensation functionalities into mobile device according to one or more illustrative aspects of the disclosure.

FIG. 1A illustrates an example of a haptic sleeve for integrating sensation functionalities into mobile devices according to one or more illustrative aspects of the disclosure. In one or more arrangements, a haptic sleeve 100 may be formed by and/or otherwise comprise a contoured housing 105. In some arrangements, the contoured housing 105 may be formed of a relatively hard plastic material (e.g., such that the contoured housing 105 forms a hard plastic shell for the computing device). In other arrangements, the contoured housing 105 may be formed of a relatively soft cloth material (e.g., nylon) and/or a foam or rubber material (e.g., neoprene), such that the contoured housing 105 forms a soft foam case for the computing device, for instance.

In addition, the haptic sleeve 100 and/or the contoured housing 105 may further include one or more haptic components, such as haptic components 115, 120, 125, and 130. Each of the one or more haptic components may be configured to provide one or more haptic effects and/or may be configured to receive one or more forms of haptic input. In one or more arrangements, any and/or all of the haptic components may be sewn into, embedded into, and/or otherwise included in the contoured housing 105 of the haptic sleeve 100 and/or disposed along one or more exterior surfaces of the contoured housing 105 so as to provide one or more tactile sensations as haptic output to a user of the computing device and/or receive tactile information as haptic input from the user. In at least one arrangement, the haptic components may be provided in input/output pairs, such that a first component capable of outputting a particular haptic sensation is provided in combination with a second component capable of receiving input corresponding to the same particular haptic sensation. For example, the haptic sleeve 100 and/or the contoured housing 105 may include an input/output pair of thermal haptic components, such as component 115 and component 120, and an input/output pair of protrusion haptic components, such as component 125 and component 130. While these components are described here as examples of the haptic components that may be included in a haptic sleeve 100, other component(s) may similarly be included in the haptic sleeve 100 instead of and/or in addition to the components illustrated in FIG. 1A.

In at least one arrangement, one or more of the haptic components may be commercially-available haptic output actuators and/or tactile input sensors that are woven into, molded into, or otherwise attached to the haptic sleeve 100. Examples of such commercially-available haptic output actuators and tactile input sensors include actuators, sensors, and other components manufactured and/or sold by companies such as Pressure Profile Systems, Inc. of Los Angeles, Calif., and Senseg Ltd. of Helsinki, Finland. Other companies that manufacture and/or sell biometric devices and/or touch sensors, such as ST Microelectronics and Bosch, also may provide such commercially-available haptic output actuators and tactile input sensors.

Furthermore, the haptic sleeve 100 and/or the contoured housing 105 may also include an input/output interface 110. The input/output interface 110 may, for instance, allow a computing device to establish a connection (e.g., a data connection) with the haptic sleeve 100 and/or control one or more of the haptic components included in the haptic sleeve 100. For example, the input/output interface 110 may allow a computing device connected to the haptic sleeve 100 to actuate one or more of the haptic components (e.g., to produce various haptic sensations), receive sensation data corresponding to input received by one or more of the haptic components, and so on. In at least one arrangement, the input/output interface 110 may comprise a Universal Serial Bus (USB) interface. In one or more additional or alternative arrangements, the input/output interface 110 may comprise any other interface via which the haptic sleeve 100 may establish a connection with a mobile device, such as an APPLE iPod Dock interface, for example.

In some embodiments, the input/output interface 110 of the haptic sleeve 100 may enable electrical power to be provided to the haptic sleeve 100. For example, electrical power may be provided to the haptic sleeve 100 from one or more devices connected to the haptic sleeve via the input/output interface 110. In some arrangements, a computing device connected to the haptic sleeve 100 may selectively activate and/or otherwise selectively provide power to the haptic sleeve 100. For example, a connected computing device might not power on the haptic sleeve 100 if the power level of the computing device is below a certain level. Additionally or alternatively, in order to conserve power, the connected computing device may selectively activate and/or selectively power one or more haptic components of the haptic sleeve 100, and not others, such that at certain power levels (e.g., low power levels) some haptic effects, but not others, may be provided.

In some embodiments, the haptic sleeve 100 may be activated and/or powered on demand, rather than being continuously powered, for instance. In some arrangements, the haptic sleeve 100 may be activated in response to receiving particular user input, such as a gesture performed on the computing device connected to the haptic sleeve 100 and/or the haptic sleeve 100 itself. For example, a user may perform a swipe gesture on the haptic sleeve 100 and/or touch a hot corner of the haptic sleeve 100 in order to power on the haptic sleeve 100. In other additional and/or alternative arrangements, the haptic sleeve 100 may include a button or switch that activates and/or deactivates the haptic sleeve 100.

In some embodiments, the device connected to the haptic sleeve 100 may power on the haptic sleeve 100 in response to receiving particular data, such as a particular message.

For example, the device connected to the haptic sleeve 100 may determine to activate and/or otherwise power on the haptic sleeve 100 (and subsequently provide power to the haptic sleeve 100) in response to receiving a message or other content that includes haptic data.

In some embodiments, the haptic sleeve 100 may further comprise one or more batteries and/or other power sources and/or hardware. In some arrangements, a battery included in the haptic sleeve 100 may be used only in powering the haptic sleeve 100 itself, while in other arrangements, a battery included in the haptic sleeve 100 also may be used in powering a computing device to which the haptic sleeve 100 is connected. For example, the haptic sleeve 100 may, in some embodiments, be used as a battery pack for a computing device to which the haptic sleeve 100 is connected. In arrangements where both the computing device to which the haptic sleeve 100 is connected and the haptic sleeve 100 itself have discrete batteries and/or other power sources, the haptic sleeve 100 may charge and/or recharge its one or more batteries using power drawn from the device to which the haptic sleeve 100 is connected (e.g., from one or more batteries and/or other hardware included in the device to which the haptic sleeve 100 is connected, such as power management hardware included in a smart phone to which the haptic sleeve 100 may be connected).

In some embodiments, the haptic sleeve 100 may take the form of a back plate for a smart phone, tablet computer, or other mobile device to which the haptic sleeve 100 may be connected. In particular, the haptic sleeve 100 may be configured to cover all or part of one or more sides of a mobile device. Additionally or alternatively, the haptic sleeve 100 may, for example, be an interchangeable part of the housing of the mobile device to which the haptic sleeve 100 can be connected. For instance, the haptic sleeve 100 may be configured to cover one or more interior and/or exterior portions of a mobile device to which the haptic sleeve 100 can be connected. Furthermore, the haptic sleeve 100 may form and/or otherwise provide an exterior surface of a mobile device to which the haptic sleeve 100 can be connected.

In some embodiments, the haptic sleeve 100 may connect to and/or communicate with one or more computing devices via one or more wired connections and/or via one or more wired communication interfaces (e.g., a USB or APPLE iPod Docket interface, as discussed above). Additionally or alternatively, the haptic sleeve 100 may connect to and/or communicate with one or more computing devices via one or more wireless connections and/or via one or more wireless communication interfaces (e.g., using Bluetooth, Zigbee, etc.). As discussed below, the haptic sleeve 100 may be used in sending and/or receiving haptic communications to and/or from one or more other haptic sleeves and/or one or more other users of such sleeves. These communications may, in some instances, be transmitted over one or more networks, and in other instances, may be transmitted over peer-to-peer connections (e.g., direct wired and/or wireless connections) between one or more haptic sleeves. In at least one arrangement, a peer-to-peer connection to another haptic sleeve may be established via the input/output interface 110 of a haptic sleeve 100. Additionally or alternatively, such sleeve-to-sleeve haptic communications may, in some instances, be point-to-point communications (e.g., from one haptic sleeve to another haptic sleeve), and in other instances, may be point-to-multipoint communications (e.g., from one haptic sleeve to a number of other haptic sleeves).

Figure 1B:
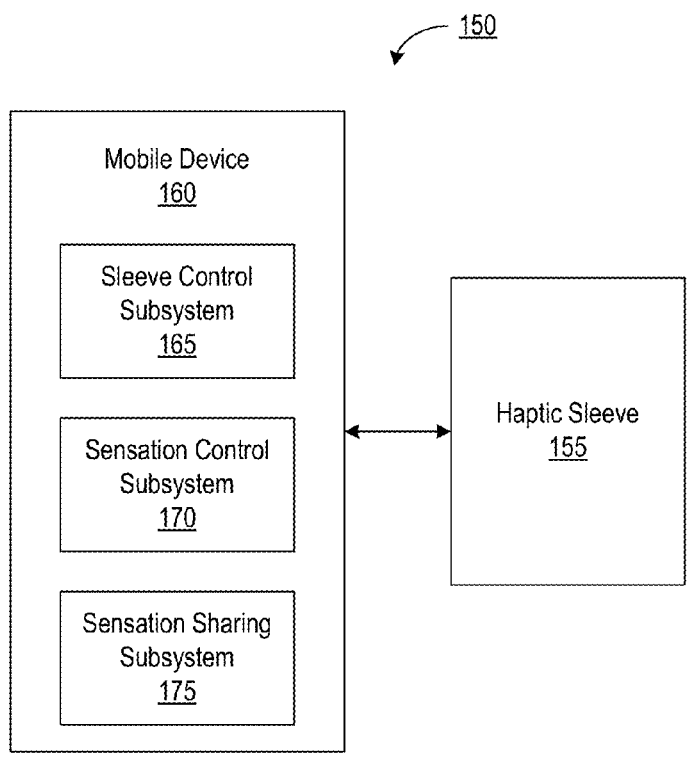
FIG. 1B illustrates an example of a system that includes a haptic sleeve according to one or more illustrative aspects of the disclosure.

FIG. 1B illustrates an example of a system 150 that includes a haptic sleeve 155 according to one or more illustrative aspects of the disclosure. As seen in FIG. 1B, system 150 may also include a mobile device 160 to which haptic sleeve 155 may be communicatively coupled. In some arrangements, mobile device 160 may be a mobile computing device, such as a smartphone, tablet computer, laptop computer, or any other type of computing device. In addition, system 150, haptic sleeve 155, and/or mobile device 160 may incorporate one or more embodiments discussed herein.

In some embodiments, mobile device 160 may include one or more subsystems, including a sleeve control subsystem 165, a sensation control subsystem 170, and a sensation sharing subsystem 175. One or more communication paths may be provided that enable the one or more subsystems to communicate with and exchange data with each other. In addition, the various subsystems illustrated in FIG. 1B may be implemented in software, hardware, or combinations thereof. In at least one arrangement, each of the subsystems illustrated in FIG. 1B can be provided by one or more processors and/or memory units included in mobile device 160. A single processor included in mobile device 160 may, for example, provide all of these subsystems in some instances, while in other instances, each subsystem may be provided as and/or by a separate processor in mobile device 160. In some instances, mobile device 160 may include other subsystems than those shown in FIG. 1B. Additionally, the embodiment shown in FIG. 1B is only one example of a system that may incorporate some embodiments, and in other embodiments, system 150 and/or mobile device 160 may have more or fewer subsystems than those illustrated in FIG. 1B, may combine two or more subsystems, or may have a different configuration or arrangement of subsystems.

In some embodiments, sleeve control subsystem 165 may enable mobile device 160 to receive, from haptic sleeve 155, sensation input captured by one or more haptic components included in haptic sleeve 155. For example, sleeve control subsystem 165 may receive, interpret, and/or otherwise process one or more signals that are received from one or more haptic components included in haptic sleeve 155, and such signals may correspond to sensation input that is provided via haptic sleeve 155. In addition, sleeve control subsystem 165 may enable mobile device 160 to cause haptic feedback to be provided via haptic sleeve 155. For example, sleeve control subsystem 165 may cause haptic feedback to be provided via haptic sleeve 155 by actuating and/or otherwise controlling one or more haptic components included in haptic sleeve 155.

In some embodiments, sensation control subsystem 170 may enable mobile device 160 to store haptic data associated with one or more sensations that can be provided as haptic feedback. For example, sensation control subsystem 170 may, in some instances, store haptic data corresponding to sensation input received by sleeve control subsystem 165 of mobile device 160 from haptic sleeve 155. In some instances, sensation control subsystem 170 may also store haptic data corresponding to one or more pre-defined sensations and/or one or more user-defined sensations that may be provided as haptic feedback via haptic sleeve 155.

In some embodiments, sensation sharing subsystem 175 may enable mobile device 160 to send haptic data to one or more other devices. For example, sensation sharing subsystem 175 may allow mobile device 160 to send haptic data to one or more recipient devices of sensation input received via haptic sleeve 155. In addition, sensation sharing subsystem 175 may enable mobile device 160 to receive haptic data from one or more other devices. Such haptic data may, for instance, describe one or more sensations to be provided as haptic feedback via haptic sleeve 155 (e.g., to a user of mobile device 160).

While the embodiment shown in FIG. 1B and the examples discussed above illustrate various subsystems as being included in mobile device 160, in some additional and/or alternative embodiments, any and/or all of these subsystems may be incorporated into and/or otherwise provided by haptic sleeve 155. For example, in some additional and/or alternative embodiments, haptic sleeve 155 may include sleeve control subsystem 165, sensation control subsystem 170, and sensation sharing subsystem 175. Additionally or alternatively, haptic sleeve 155 may include various hardware and/or software to implement any and/or all of these subsystems.

Figure 2:
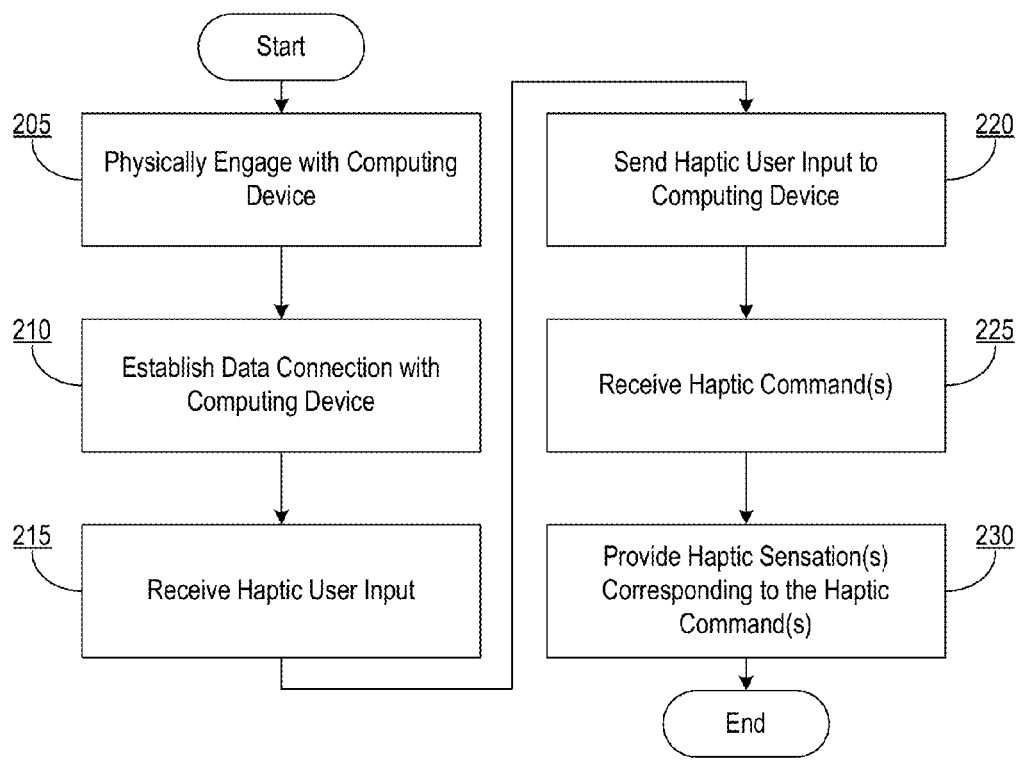
FIG. 2 illustrates an example method of integrating sensation functionalities into a mobile device using a haptic sleeve according to one or more illustrative aspects of the disclosure.

FIG. 2 illustrates an example method of integrating sensation functionalities into a mobile device using a haptic sleeve. In step 205, a haptic sleeve 100 may physically engage with a computing device (e.g., the contoured housing 105 of the haptic sleeve 100 may be attached to and/or otherwise couple with one or more sides and/or surfaces of the computing device). In step 210, the haptic sleeve 100 may establish a data connection with the computing device (e.g., via the input/output interface 110). In step 215, the haptic sleeve 100 may receive haptic user input (e.g., via one or more haptic components included in haptic sleeve 100, such as thermal input component 115 and protrusion input component 125). In step 220, the haptic sleeve 100 may send the haptic user input to the computing device (e.g., via the input/output interface 110).

In step 225, the haptic sleeve 100 may receive one or more haptic commands (e.g., from the computing device via the input/output interface 110). In at least one arrangement, the one or more commands may be configured to cause the haptic sleeve 100 to provide haptic feedback that includes one or more sensations, such as, for instance, one or more sensations specified by a second user of a second computing device. Additionally or alternatively, the haptic feedback may correspond to sensation input provided by the second user and received by the second computing device via a second haptic sleeve connected to and/or otherwise associated with the second computing device. Subsequently, in step 230, the haptic sleeve 100 may provide the one or more haptic sensations corresponding to the one or more haptic commands (e.g., by activating and/or modulating one or more of the haptic components included in the haptic sleeve 100). In this manner, a computing device that might otherwise be unable to provide one or more types of haptic feedback may be equipped with a haptic sleeve via which the haptic feedback then may be provided.

Figure 3:
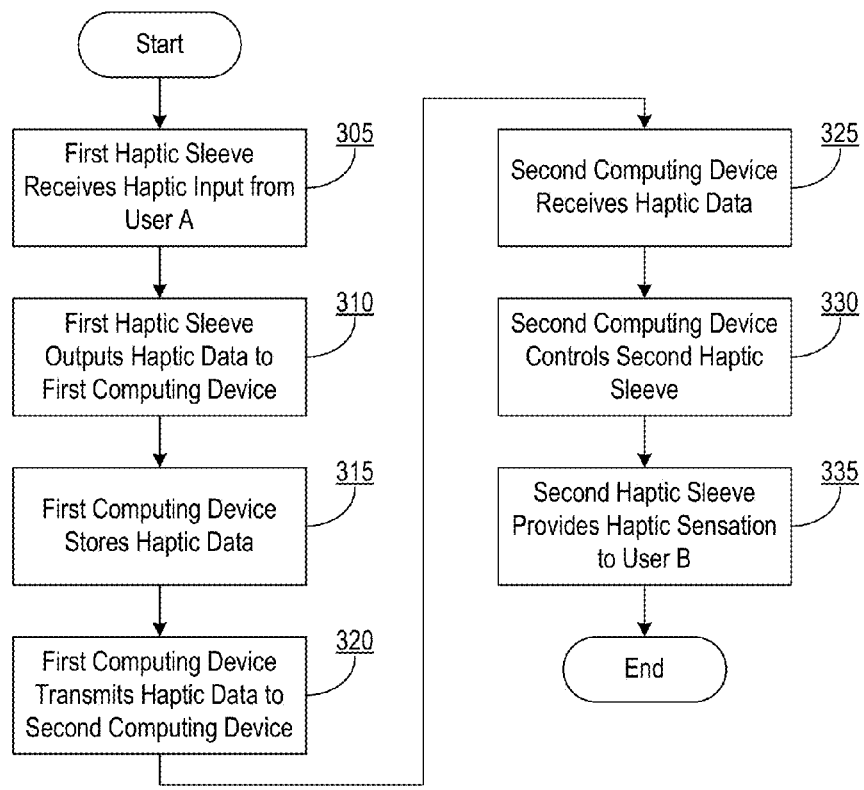
FIG. 3 illustrates an example method of providing haptic communication using haptic sleeves according to one or more illustrative aspects of the disclosure.

FIG. 3 illustrates an example method of providing haptic communication using haptic sleeves according to one or more illustrative aspects of the disclosure. In step 305, a first haptic sleeve may receive haptic input from a first user (e.g., "User A"). The first haptic sleeve may, for example, implement one or more features of the haptic sleeve 100 described above. Additionally or alternatively, the first haptic sleeve may be physically engaged with, attached to, and/or otherwise coupled to a first computing device, which may, for instance, be a mobile phone or tablet computer that implements one or more aspects of the computer system 1100 described below. Further, the first haptic sleeve may have established a data connection (e.g., via a USB interface) with the first computing device, for instance.

After receiving the haptic input, the first haptic sleeve may, in step 310, output, to the first computing device, haptic data corresponding to the received haptic input. The first computing device may receive the haptic data from the first haptic sleeve, and in step 315, the first computing device may store the haptic data. For example, the first computing device may store the haptic data in working memory, so as to enable the haptic data to be modified by the first computing device and/or shared with one or more other devices and/or users.

In step 320, the first computing device may transmit the stored haptic data to second computing device (e.g., another mobile phone or tablet computer), which may, for example, be used by a second user (e.g., "User B"). For example, the first computing device may transmit the stored haptic data to a second computing device via a wired and/or wireless data connection (e.g., using a wireless local area network, a Bluetooth connection, an NFC connection, a cellular data connection, etc.). Subsequently, in step 325, the second computing device may receive the haptic data from the first computing device. Additionally or alternatively, the second computing device may be equipped with a second haptic sleeve (e.g., similar to how the first computing device may be equipped with a first haptic sleeve).

In step 330, the second computing device may control the second haptic sleeve to cause the second haptic sleeve to provide haptic feedback (e.g., to a user of the second computing device and/or the second haptic sleeve) based on the received haptic data. For example, in step 330, the second computing device may electronically actuate one or more haptic components included in the second haptic sleeve to cause the second haptic sleeve to provide one or more haptic sensations specified by the received haptic data. Subsequently, in step 335, the second haptic sleeve may provide the one or more haptic sensations to the second user (e.g., as a result of the second computing device electronically actuating the one or more haptic components included in the second haptic sleeve). In this manner, a first haptic sleeve connected to a first computing device may, for example, be used by a first user in order to provide haptic feedback to a second user of a second computing device, which may be equipped with a second haptic sleeve.

Having discussed an example of providing haptic communications using haptic sleeves, a method in which sensation input may be captured using a haptic sleeve and subsequently stored by a computing device communicatively coupled to the haptic sleeve will now be described with respect to FIG. 5.

Figure 5:
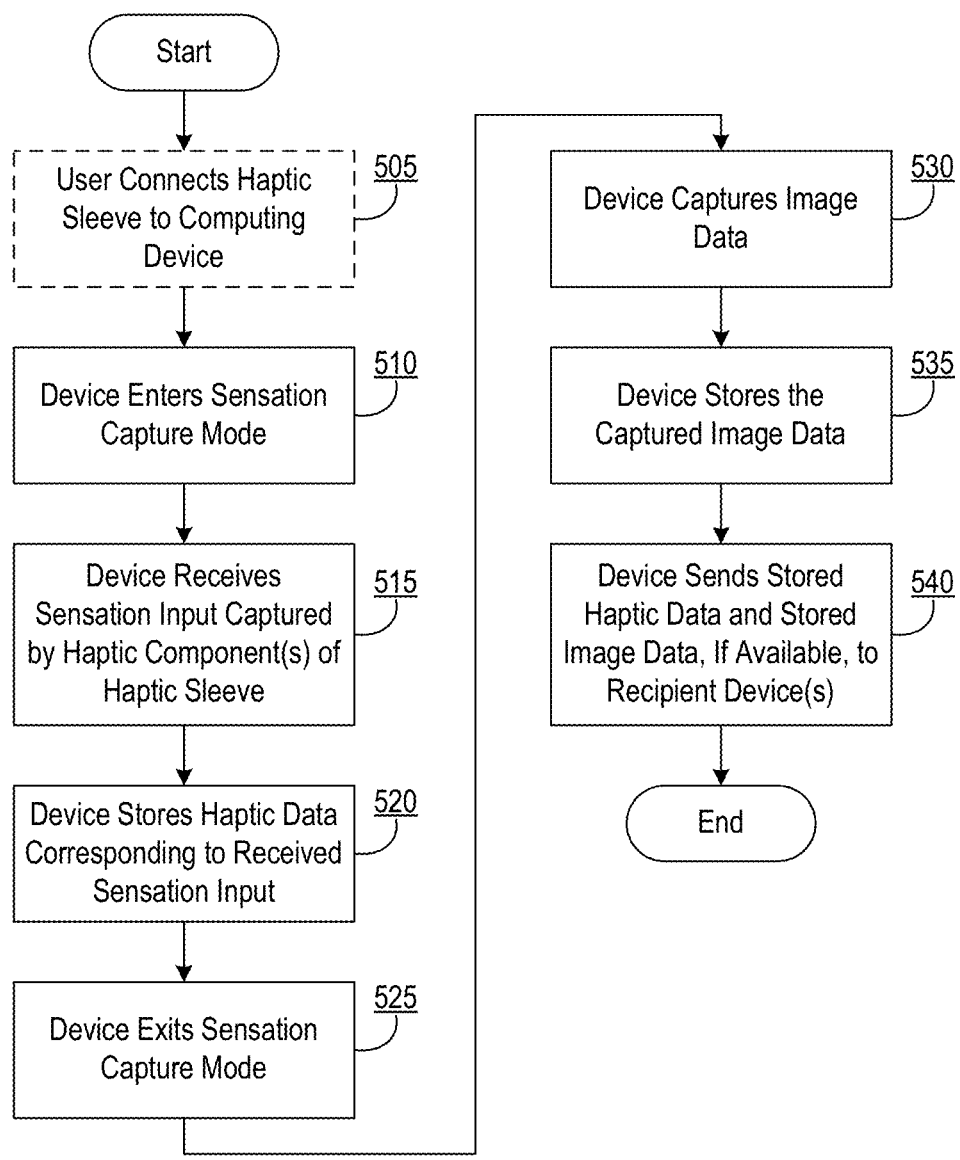
FIG. 5 illustrates an example method of receiving and storing sensation input according to one or more illustrative aspects of the disclosure.

FIG. 5 illustrates an example method of receiving and storing sensation input according to one or more illustrative aspects of the disclosure. In step 505, a user of a computing device may connect a haptic sleeve to the computing device, which may implement and/or embody one or more aspects of the example computer system 1100 discussed in greater detail below, for example. In one or more arrangements, connecting a haptic sleeve to a computing device may include coupling the haptic sleeve to the computing device such that the haptic sleeve physically engages with the computing device. Additionally or alternatively, connecting the haptic sleeve to the computing device may include communicatively coupling an input/output interface of the haptic sleeve with an input/output interface of the computing device. For example, where the computing device is a smart phone or tablet computer, connecting the haptic sleeve to the computing device may include inserting one or more electrical connectors of the haptic sleeve into one or more ports of the computing device, or vice versa.

In step 510, the computing device may enter a sensation capture mode. In one or more arrangements, a sensation capture mode may be a state in which the computing device may monitor and/or store measurements received via one or more haptic components of the connected haptic sleeve. The measurements may, for instance, represent an amplitude of and/or changes in an analog signal (e.g., a starting amount of and/or subsequent changes in electrical current and/or voltage received via the one or more haptic components) and/or an initial value of and/or changes in a digital signal (e.g., a starting value of and/or subsequent changes in digital data received via the one or more haptic components). In at least one arrangement, the computing device may be configured to automatically enter the sensation capture mode in response to (and/or otherwise based on) detecting that a haptic sleeve has been connected. Additionally or alternatively, the computing device may be configured to enter the sensation capture mode in response to (and/or otherwise based on) a user-issued command, such as a user selection of a menu item or particular application provided by and/or executed on the computing device to which the haptic sleeve is connected.

In step 515, the computing device may receive sensation input captured by one or more components of the haptic sleeve. As noted above, the sensation input captured by the one or more components of the haptic sleeve and received by the computing device can be analog signal information and/or can be digital signal information. Where the computing device receives analog signal information as sensation input, the computing device may, for example, digitally process the analog signal information to determine one or more magnitude and/or direction values for the sensation input at particular times and/or at particular locations of the haptic sleeve. For example, the computing device may calculate one or more vectors representing the sensation input, and the computing device may determine the vector components of the vectors based at least in part on a starting amount of and/or subsequent changes in analog current and/or voltage measured with particular haptic components (which may, for instance, be known to be located at particular positions on the haptic sleeve). In another example, where the computing device receives digital signal information as sensation input, the computing device may calculate similar vectors representing the sensation input, and the computing device may determine the vector components of the vectors based at least in part on an initial value of and/or subsequent changes in the digital data output by particular haptic components (which again may be known to be located at particular positions on the haptic sleeve). In at least one arrangement, the digital data output by particular haptic components may further include position information, and the computing device may determine the vector components based at least in part on the position information included in the digital data received from the haptic components.

In one or more arrangements, the sensation input captured by the one or more components of the haptic sleeve may reflect and/or otherwise correspond to a non-vibratory sensation. A "non-vibratory" sensation may include any sensation that includes at least one effect that does not involve producing vibration. Examples of non-vibratory sensations include texture sensations, pressure sensations, wetness sensations, adhesion sensations, and thermal sensations, produced either alone, in combination with each other, or in combination with one or more vibratory sensations. For example, a texture sensation or a protrusion effect produced either alone or in combination (e.g., with each other) could be considered non-vibratory haptic sensations. As another example, a protrusion effect and a vibration sensation produced in combination (e.g., with each other) could be considered a non-vibratory haptic sensation, whereas the vibration sensation produced on its own might not be considered a non-vibratory haptic sensation.

In step 520, the computing device may store haptic data corresponding to the received sensation input. In one or more arrangements, storing haptic data corresponding to the received sensation input may include storing one or more position, intensity, and/or duration values describing the received sensation input. For example, the computing device may store the vectors and/or vector components calculated and/or otherwise determined that describe the received sensation input.

In step 525, the computing device may exit the sensation capture mode. For example, in step 525, the computing device might stop monitoring and/or storing measurements received via the one or more haptic components of the connected haptic sleeve. In some arrangements, the computing device may exit the sensation capture mode based on determining that a predetermined amount of time has elapsed since the computing device entered the sensation capture mode or since sensation input was last received via the one or more haptic components. In other arrangements, the computing device may exit the sensation capture mode based on a user-issued command, such as a user selection of a menu item displayed by the computing device as part of a user interface, for instance.

In optional step 530, the computing device may capture image data, such as image data that is to be stored in association with the haptic data. As discussed in greater detail below, by capturing image data and/or storing such image data in association with the haptic data, the computing device may be able to capture both the "look" and "feel" of an object, event, or other scene. Additionally or alternatively, the computing device may be able to subsequently display the image data and provide the associated feedback so as to reproduce both the "look" and "feel" of the object, event, or scene that was captured. In one or more arrangements, capturing image data may include capturing an image of a scene using one or more integrated or otherwise connected cameras. Additionally or alternatively, capturing image data may include receiving an image file (e.g., from a location in memory of the computing device, from a removable memory device attached to the computing device, via a network, such as the Internet, etc.).

In optional step 535, the computing device may store the captured image data. In one or more arrangements, storing the captured image data may include aligning the image data with the sensation input and storing the aligned image data. For example, in order to more accurately capture the "look" and "feel" of the object, event, or scene captured in the image data, it may be desirable to align the image data with the sensation input, so that the haptic data corresponding to the sensation input more closely reflects how the object, event, or scene in the image feels at different points. In some arrangements, the computing device may automatically align the image data with the haptic data, for example, by capturing the image data with an integrated camera and the sensation input with a haptic sleeve substantially simultaneously, and then using predefined equations for the integrated camera and the haptic sleeve to correlate particular points or pixels of the image data with particular points of the sensation input. In other arrangements, the computing device may display or otherwise provide a user interface that allows the user to manually align the image data with the haptic data. For example, the computing device may display a user interface that prompts the user to move and/or scale the image corresponding to the image data in relation to the haptic data and the received sensation input, which may, for instance, be illustrated in the user interface using one or more icons.

Subsequently, in step 540, the computing device may send the stored haptic data and the stored image data to one or more recipient devices. In some instances, the computing device might send only the stored haptic data to the one or more recipient devices (e.g., if image data was not captured and/or stored in optional steps 530 and/or 535). In one or more arrangements, the haptic data may include information that enables the one or more recipient devices to provide haptic feedback that reflects the received sensation input. For instance, if the received sensation input corresponds to a user poking or stroking the haptic sleeve in a particular way (e.g., with a particular rhythm or in a particular shape, such as a heart), the corresponding haptic data may enable a recipient device to provide haptic feedback that feels (e.g., to a recipient user touching or holding a haptic sleeve connected to the recipient device) like the poking or stroking in the particular way (e.g., with the particular rhythm or in the particular shape).

In one or more additional arrangements, where both haptic data and image data are sent to one or more recipient devices, the combination of the haptic data and the image data may include information that enables the one or more recipient devices to provide haptic feedback that not only reflects the received sensation input, but also lines up with or otherwise corresponds to features of the captured image. For instance, if the image data includes a picture of a carpet and the haptic data corresponds to a texture of the carpet, the image data and the haptic data may enable a recipient device to provide haptic feedback that feels like the texture of the carpet while simultaneously displaying the picture of the carpet. In this manner, a user of the recipient device may be able to feel how different parts of an object included in an image might feel in actuality.

Having discussed an example method in which sensation input may be captured using a haptic sleeve and subsequently stored by a computing device communicatively coupled to the haptic sleeve, several illustrations of how such sensation input may be captured and stored will now be discussed with respect to FIGS. 6A and 6B.

Figures 6A, 6B:
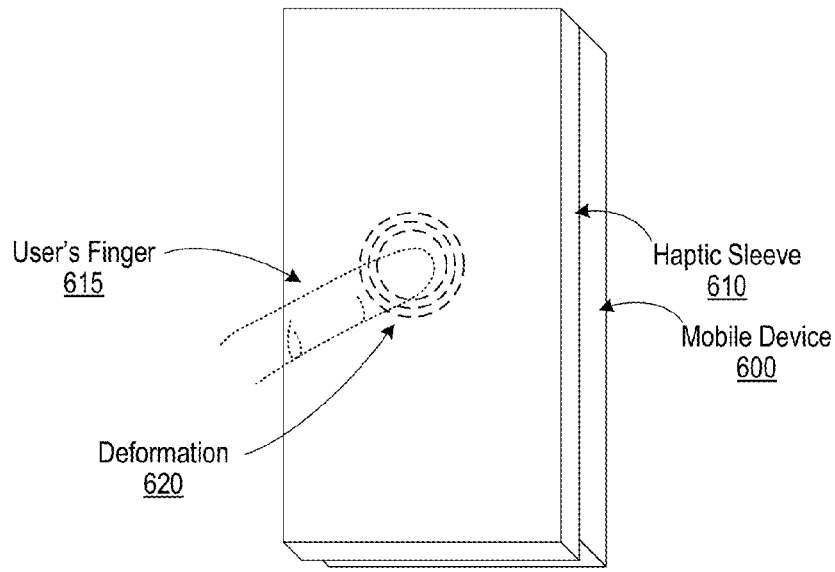
FIG. 6A illustrates an example of receiving sensation input via a haptic sleeve according to one or more illustrative aspects of the disclosure.
FIG. 6B illustrates an example of haptic data that corresponds to received sensation input according to one or more illustrative aspects of the disclosure.

FIG. 6A illustrates an example of receiving sensation input via a haptic sleeve according to one or more illustrative aspects of the disclosure. For instance, as seen in FIG. 6A, a mobile computing device 600 and a haptic sleeve 610 may be connected. In one or more arrangements, the haptic sleeve 610 may physically engage with the mobile device 600, for instance, and may substantially cover a rear side of the mobile device 600.

Once the haptic sleeve 610 and the mobile device 600 are connected, a user of the mobile device 600 may provide sensation input to the mobile device 600 by interacting with the haptic sleeve 610. For instance, in the example illustrated in FIG. 6A, the user may use his or her finger 615 to poke the haptic sleeve 610, thereby causing a deformation 620 in the surface of the haptic sleeve. This deformation 620 may in turn be received as sensation input by mobile device 600 via haptic sleeve 610. Additionally or alternatively, the mobile device 600 may store haptic data corresponding to the sensation input, namely, the deformation 620, by performing one or more steps of the example method discussed above.

An example of the haptic data that may be captured and stored when the user provides sensation input via the haptic sleeve in this manner is illustrated in FIG. 6B. In particular, FIG. 6B illustrates an example of haptic data that corresponds to received sensation input according to one or more illustrative aspects of the disclosure.

For instance, as seen in FIG. 6B, in receiving and storing haptic data corresponding to the deformation 620 that was received as sensation input in the example discussed above, the mobile computing device 600 may receive and store a series of values describing the received sensation input, namely, the deformation 620. The values received and stored by the computing device 600 may, for example, include information about one or more particular haptic effects describing the received sensation (e.g., a deformation or "poke" haptic effect), information about the position at which the sensation was received (e.g., in coordinates mapped to the surface of the haptic sleeve 610), information about the magnitude of the haptic effects describing the received sensation (e.g., the depth or pressure of the "poke" haptic effect in the case of the deformation 620 illustrated in this example), and/or information about the duration of the haptic effects describing the received sensation (e.g., a number of seconds or milliseconds for which a particular sensation was received). As seen in the example illustrated in FIG. 6B, various values associated with the sensation input may change over time, as these values may represent dynamic sensations, such as combined movements (e.g., a poking motion that builds and then subsides, or a moving outline of a shape, such as a heart or figure-eight, that is traced out over a short period of time as the user moves his or her finger in the pattern of the shape), in addition to substantially discrete effects (e.g., a discrete increase or decrease in temperature of the haptic sleeve 610).

As discussed above, after receiving and storing sensation input, a computing device may send and/or otherwise share haptic data corresponding to the stored sensation input with one or more other devices, which may be configured to provide haptic feedback based on the haptic data. An example of a system in which one user may provide sensation input on one haptic sleeve to cause another user to receive corresponding haptic feedback on another haptic sleeve will now be described with respect to FIG. 7.

Figure 7:
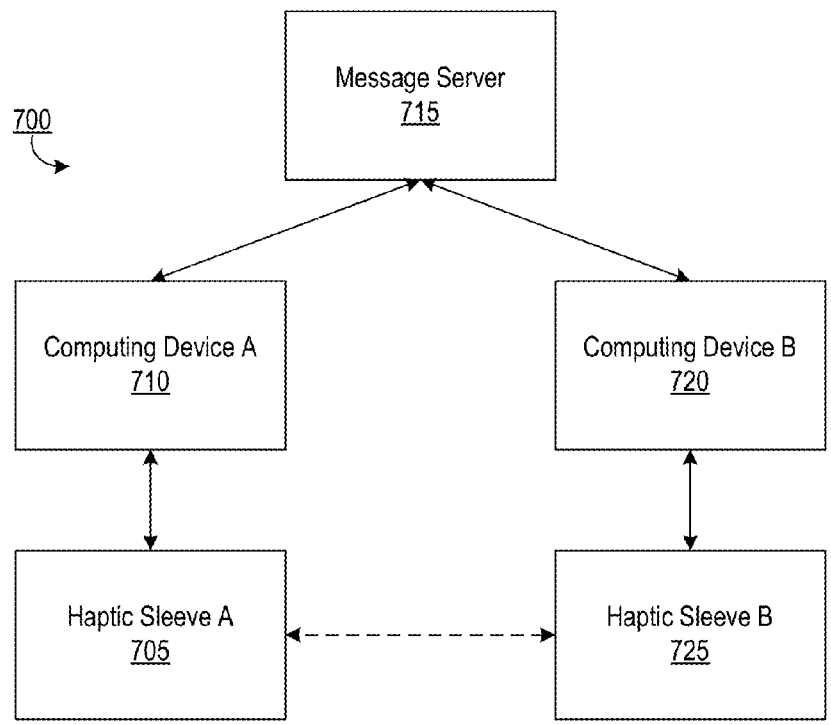
FIG. 7 illustrates an example system for providing tactile communications according to one or more illustrative aspects of the disclosure.

FIG. 7 illustrates an example system for providing tactile communications according to one or more illustrative aspects of the disclosure. In system 700, a first haptic sleeve 705 may be connected to a first computing device 710, and the first computing device 710 may receive sensation input via the haptic sleeve 705. In addition, the first computing device 710 may store haptic data representing such sensation input by performing one or more steps of the example methods discussed above, for example, and/or may send the haptic data to a message server 715. Subsequently, message server 715 may send the haptic data to a second computing device 720, which may receive and decode the haptic data, as discussed below. Then, the second computing device 720 may provide haptic feedback, based on the haptic data, to a user of the second computing device 720 via a second haptic sleeve 725 connected to the second computing device 720. In this manner, one user may use the first haptic sleeve 705 to cause another user to receive particular haptic feedback by way of the other user's own haptic sleeve 725. Additionally or alternatively, the other user may similarly be able to user haptic sleeve 725 to cause the first user to receive particular haptic feedback via the first haptic sleeve 705.

An example of the steps that a computing device may perform in receiving haptic data and subsequently providing haptic feedback based on the haptic data will now be described with respect to FIG. 8.

Figure 8:
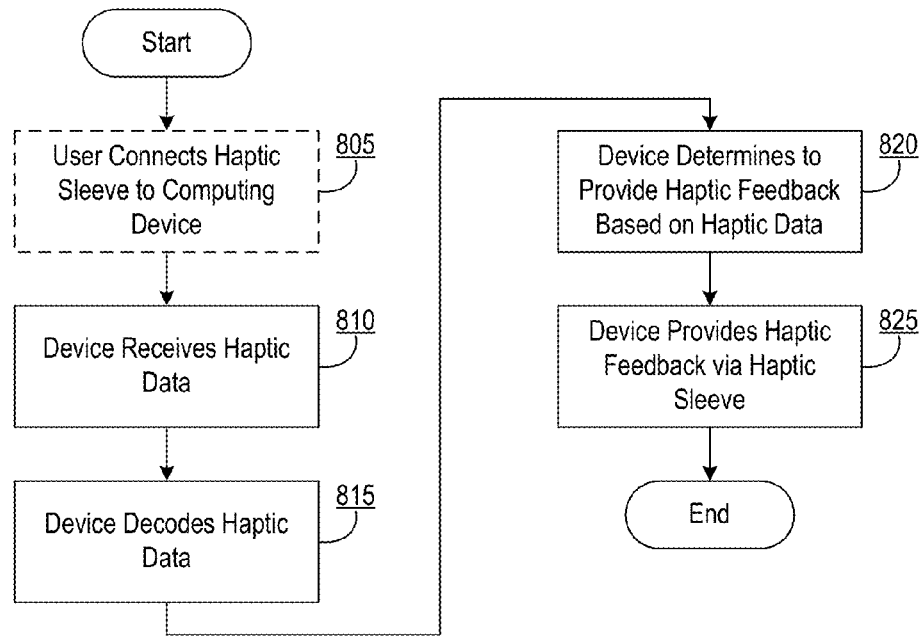
FIG. 8 illustrates an example method of receiving haptic data and providing haptic feedback according to one or more illustrative aspects of the disclosure.

FIG. 8 illustrates an example method of receiving haptic data and providing haptic feedback according to one or more illustrative aspects of the disclosure. In step 805, a user of a computing device may connect a haptic sleeve to the computing device, which may implement and/or embody one or more aspects of the example computer system 1100 discussed in greater detail below, for example, and the haptic sleeve may be connected to the computing device similar to how such a haptic sleeve may be connected in step 505 of the example method discussed above.

In step 810, the computing device may receive haptic data. In one or more arrangements, the haptic data may be received as part of (e.g., as embedded content in or as an attachment to) an electronic message, such as a text message or email that may be received by the computing device. In one or more additional and/or alternative arrangements, the haptic data may be received as part of a streaming session or via a peer-to-peer connection with another computing device. In at least one arrangement, receiving haptic data may include receiving image data associated with the haptic data, and in some instances, the image data may be aligned with the haptic data, as discussed above.

In step 815, the computing device may decode the received haptic data. In at least one arrangement, decoding the haptic data may include decomposing one or more data structures included in the haptic data into individual vectors and/or vector components that can be mapped to one or more particular haptic effects (e.g., to be reproduced on a haptic sleeve in providing haptic feedback).

Subsequently, in step 820, the computing device may determine to provide particular haptic feedback based on the haptic data. For example, in some instances, the computing device may determine to provide haptic feedback that matches the haptic feedback specified by the haptic data, while in other instances, the computing device may determine to provide alternative haptic feedback that is similar to, but does not necessarily match, the haptic feedback specified by the haptic data. In one or more arrangements, the computing device may determine to provide particular haptic feedback based on one or more user preferences, the capabilities of the connected haptic sleeve, and/or other information. For instance, if the haptic data specifies that a thermal sensation is to be provided as haptic feedback, and if the user has set preferences specifying that thermal effects are not to be provided and/or if the haptic sleeve does not include the necessary components to reproduce thermal effects, then the computing device may determine to provide alternative haptic feedback that does not include the thermal sensation specified in the haptic data.

Thereafter, in step 825, the computing device may provide the haptic feedback (e.g., the haptic feedback that the computing device determined to provide in step 820) via the connected haptic sleeve. In instances where the computing device also received image data with the haptic data, such as image data that is aligned with the haptic data, the computing device may further display the image data in conjunction with providing the haptic feedback via the haptic sleeve.

Having described an example method that a computing device may perform in receiving haptic data and providing haptic feedback based on the haptic data, an example illustrating how sensation input may be captured on one haptic sleeve and reproduced on another will now be described with respect to FIGS. 9A and 9B.

Figure 9A:
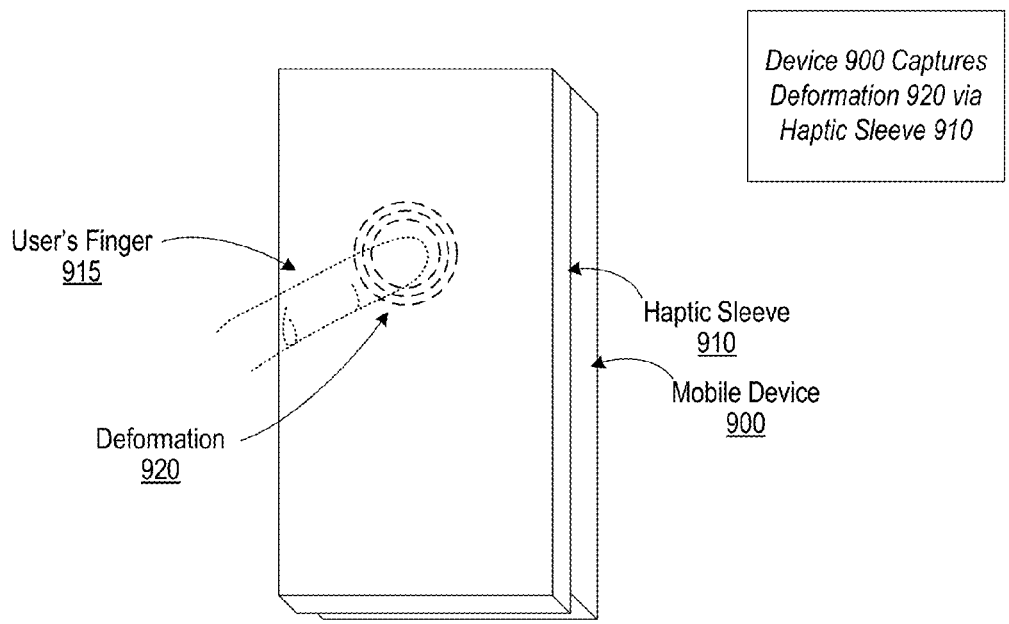
FIGS. 9A and 9B illustrate examples of receiving sensation input and providing haptic feedback via haptic sleeves according to one or more illustrative aspects of the disclosure.
Figure 9B:
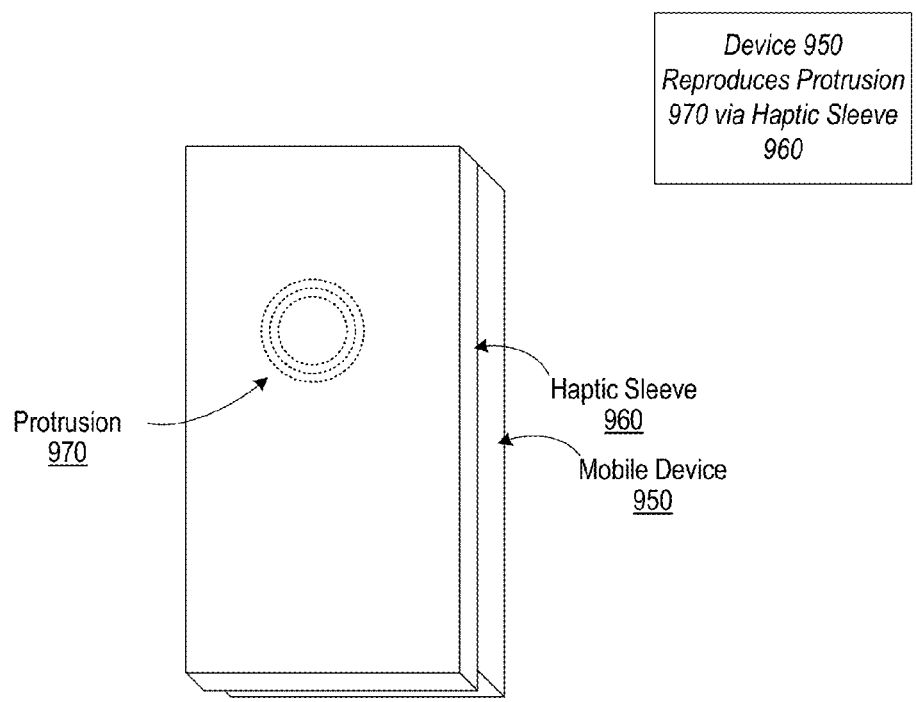

In particular, FIGS. 9A and 9B illustrate examples of receiving sensation input and providing haptic feedback via haptic sleeves according to one or more illustrative aspects of the disclosure. As seen in FIG. 9A, a mobile computing device 900 may capture sensation input via a connected haptic sleeve 910, and the sensation input may include a poking effect corresponding to a user's finger 915 poking the haptic sleeve 910 and causing a deformation 920 in the haptic sleeve 910. Subsequently, the mobile computing device 900 may store haptic data corresponding to the captured sensation input and send the haptic data to another computing device, as discussed above, for instance.

Then, as seen in FIG. 9B, a recipient mobile computing device 950 may receive the haptic data from the first mobile computing device 900. The recipient mobile computing device 950 may be connected to a haptic sleeve 960, and based on the haptic data received from the first mobile computing device 900, the recipient mobile computing device 950 may provide haptic feedback based on the haptic data. For example, in providing such haptic feedback, the mobile computing device 950 may cause a protrusion 970 to be formed in the haptic sleeve 960, and the protrusion 970 may correspond in position, magnitude (e.g., length, width, and/or depth), and/or duration to the deformation 920 received as sensation input on the other haptic sleeve 910.

Figure 10:
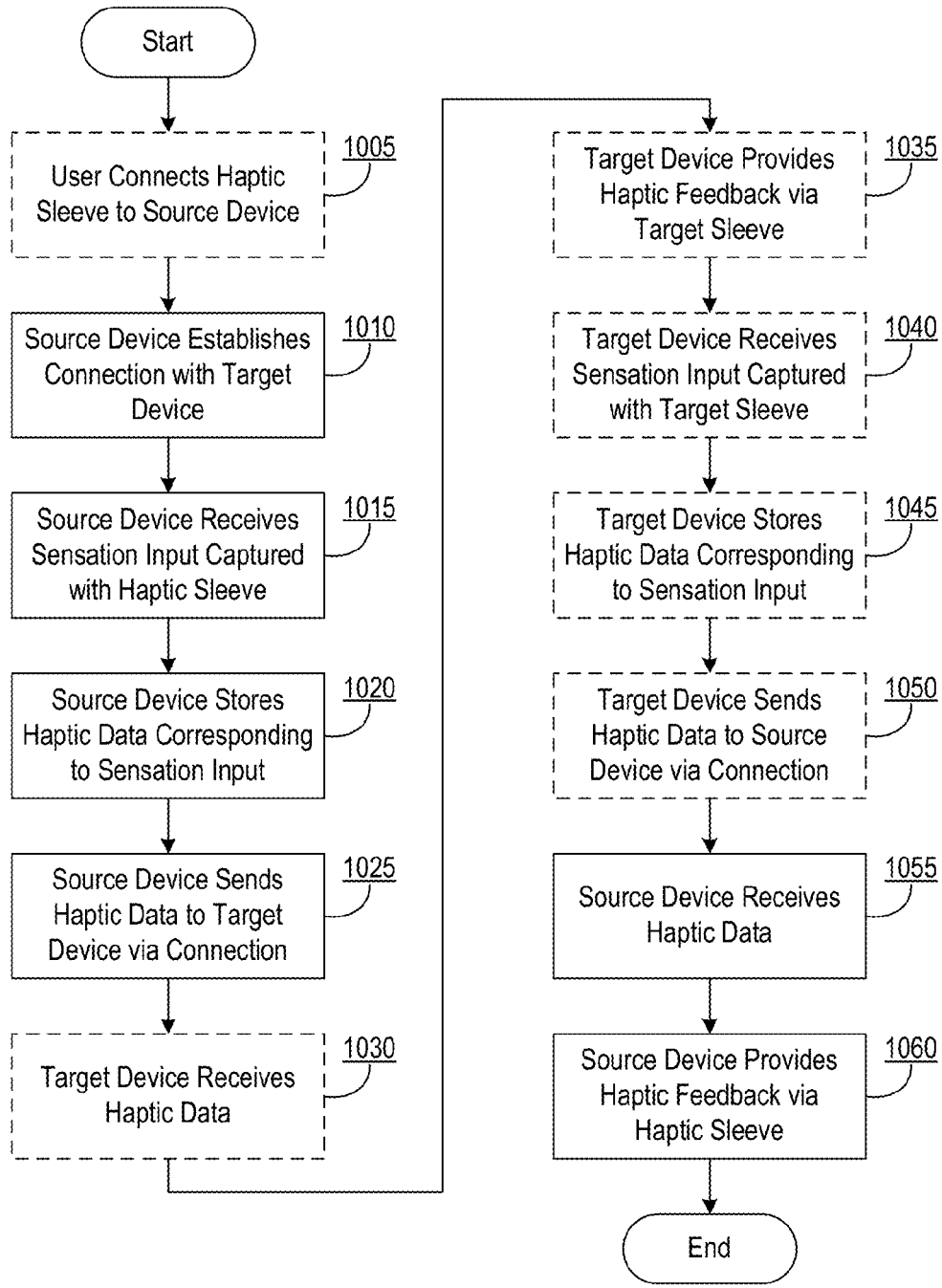
FIG. 10 illustrates an example method of providing tactile communications according to one or more illustrative aspects of the disclosure.

Turning now to FIG. 10, an example of providing real-time tactile communications between haptic sleeves and corresponding computing devices via a streaming, peer-to-peer data connection will now be discussed.

FIG. 10 illustrates an example method of providing tactile communications according to one or more illustrative aspects of the disclosure. In step 1005, a user of a computing device may connect a haptic sleeve to the computing device, which may implement and/or embody one or more aspects of the example computer system 1100 discussed in greater detail below, for example, and the haptic sleeve may be connected to the computing device similar to how such a haptic sleeve may be connected in step 505 of the example method discussed above. In the discussion of the example method that follows, this computing device may be referred to as the "source device" for convenience of reference.

In step 1010, the source device may establish a connection with another computing device, which may be referred to as the "target device." In one or more arrangements, the target device may be equipped with and/or may be otherwise connected to its own haptic sleeve, similar to how the source device may be connected to a haptic sleeve. According to one or more aspects, the connection established between the source device and the target device may be a streaming, peer-to-peer data connection that allows the source device and the target device to exchange information, including haptic data, in real-time. By establishing such a connection, the user of the source device may be able to send and receive haptic-enhanced instant messages to and/or from the user of the target device, and vice versa. Additionally or alternatively, the sensation input and haptic feedback output may be captured and/or provided by haptic sleeves at both the source device and the target device.

For example, in step 1015, the source device may receive sensation input captured with the haptic sleeve connected to the source device. For example, the source device may receive sensation input in the form of a protrusion, as in the examples discussed above.

Subsequently, in step 1020, the source device may store haptic data corresponding to the received sensation input. For example, the source device may store haptic data describing the protrusion received as sensation input in step 1015.

In step 1025, the source device may send the haptic data to the target device via the connection established in step 1010. In one or more arrangements, the source device may send the haptic data substantially simultaneously as the sensation input is received. For example, the source device may send haptic data describing the protrusion received as sensation input in step 1015, even as aspects of the protrusion may be changing, such as the position of the deformation on the haptic sleeve of the source device (e.g., if the user is sliding their finger along the surface of the haptic sleeve), the magnitude of the deformation on the haptic sleeve of the source device (e.g., if the user is increasing or decreasing the pressure they are applying with their finger to the surface of the haptic sleeve, and thereby changing the pressure and/or depth of the deformation), and/or the duration of the deformation on the haptic sleeve of the source device (e.g., if the user is varying the position and/or pressure applied to the haptic sleeve for different intervals of time).

In step 1030, the target device may receive the haptic data sent by the source device via the connection established between the two devices. Then, in step 1035, the target device may provide haptic feedback via the haptic sleeve connected to the target device, and the haptic feedback may be based on the haptic data received from the source device. For example, where the haptic data included information about the protrusion discussed in the examples above, the target device may reproduce a protrusion on the haptic sleeve that corresponds to the protrusion described by the haptic data.

In step 1040, the target device may receive sensation input via its haptic sleeve. Such sensation input may, for instance, represent a response by the user of the target device to the user of the source device. For example, in response to receiving a poke from the user of the source device, the user of the target device may trace their finger in the shape of a smiley face on the haptic sleeve of the target device, causing this shape to be received as sensation input by the target device.

In step 1045, the target device may store haptic data describing the sensation input received in step 1040. Subsequently, the target device may send, in step 1050, this haptic data to the source device via the connection established between the two devices. As above, in one or more arrangements, the target device may send haptic data to the source device substantially simultaneously as the sensation input is received by the target device.

Thereafter, in step 1055, the source device may receive the haptic data, and in step 1060, the source device may provide haptic feedback to the user of the source device via the haptic sleeve, where the haptic feedback provided to the user of the source device via the haptic sleeve is based on the haptic data received from the target device.

Having described various methods and examples for receiving, storing, and providing haptic feedback using haptic sleeves, as well as other features that may be provided by computing devices and/or haptic sleeves, several additional aspects of the disclosure will now be discussed.

As also discussed above, haptic feedback is something that may be missing from current mobile device platforms. By including such feedback, a new dimension in communication may be provided. Haptic feedback may include things that a human can feel (e.g., with their hand or hands), such as pressure, texture, pinching, heat, slip, shape, corners, and so on. Aspects of the disclosure relate to incorporating these sensations into cellular messaging services provided via mobile devices.

According to one or more aspects, tactile sensations may be incorporated into mobile devices by integrating tactile feedback sensor(s) into a mobile device sleeve accessory. This may improve the user interaction with the mobile device and enable a multitude of interface designs to improve, customize, and enhance usability of the tactile sensation. Additionally or alternatively, sleeve-to-sleeve interaction (e.g., a "peer-to-peer" mode) may simplify the transfer and replication of tactile feedback from one mobile device to another mobile device or to a group of mobile devices. Furthermore, the sleeve accessory may deliver compatibility across multiple handset manufacturers and platforms and/or may provide operating system (OS) independence.

In one or more arrangements, tactile feedback may be added to a mobile device by the addition of a mobile accessory (e.g., peripheral) device, such as a sleeve. Currently, basic sleeves (e.g., that do not include haptic functionalities) may be common accessories for mobile devices. Moreover, with the addition of popular culture, science, and marketing, the cellular phone accessories industry has skyrocketed to meet the ever-growing needs of the consumer. For instance, the touch screen adoption has exploded, but current touch screens might not provide any sort of tactile feedback (e.g., one might not feel the touch of a person at the remote end of a video conversation or any other social media). According to one or more aspects, the phones and/or mobile devices can be augmented with this dimension (e.g., tactile haptic feedback) with the inclusion of peripheral devices.

Currently, many mobile devices include a Universal Serial Bus (USB) port and/or an APPLE iPod Dock connector port (e.g., a power/USB port) that can be used to power and/or control a haptic sleeve. The haptic sleeve can then act as a transducer by providing and/or capturing tactile sensations.

Figure 4A:
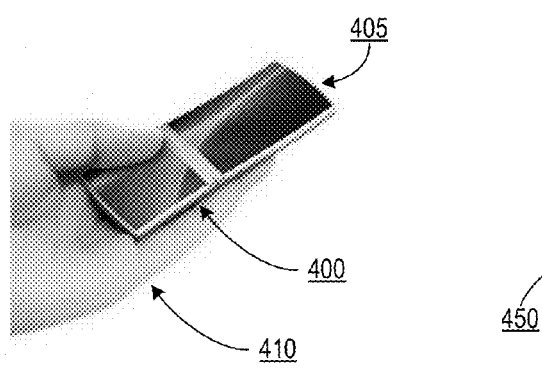
FIGS. 4A and 4B illustrate additional examples of haptic sleeves according to one or more illustrative aspects of the disclosure.
Figure 4B:
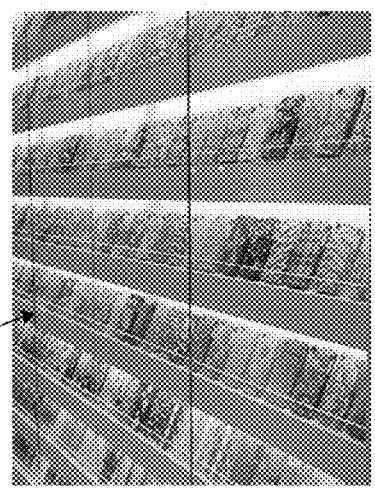

FIG. 4A illustrates how an example haptic sleeve 400 might be fitted around a mobile device 405 that is configured to be held in a user's hand 410. FIG. 4B illustrates an example of an array 450 of cell phone "skins" that could be retrofitted to be haptic sleeves and/or could be replaced by haptic sleeves.

An array of applications and/or user interface designs may be made possible using these devices (e.g., haptic sleeves). For example, mobile devices can provide customizable touch tones (e.g., more than just plain vibration) instead of and/or in addition to ring tones.

Thus, aspects of the disclosure enable and encompass integrating at least one haptic/tactile feedback sensor into a mobile device peripheral. In at least one arrangement, the mobile device peripheral may be designed as a mobile device sleeve. In one or more arrangements, the mobile device peripheral may be connected to a mobile device interface. In some arrangements, the mobile device interface may be a USB port. Additionally or alternatively, the mobile device interface may provide power to a mobile device peripheral, and/or the mobile device interface may provide means to record and/or replay haptic feedback.

According to one or more additional aspects of the disclosure, at least one of the mobile device peripherals may be used to record haptic feedback. The recorded haptic feedback may be transmitted to at least one other mobile device. The recorded haptic feedback may be received as a haptic feedback message. The received haptic feedback information may be interpreted by the mobile device and communicated to the peripheral (e.g., a peripheral connected to the mobile device). Subsequently, the haptic feedback may be replayed on the peripheral of the recipient mobile device.

Additional aspects of the disclosure enable and encompass communication (e.g., between haptic sleeves and computing devices, between haptic sleeves and other haptic sleeves, etc.) by way of USB and/or other connected interfaces and/or via a multitude of technologies such as WiFi, Bluetooth, Near Field Communications (NFC), and so on. Further additional and/or alternative aspects enable and encompass interpreting and communicating a haptic effect to a user only when a haptic accessory is turned on, and/or when the phone (or other mobile device) has a haptic sleeve on and the phone (or other mobile device) is being held in the user's hand. Additionally or alternatively, the user/receiver may choose to turn on and/or off haptic effect reception based on one or more filters, and/or such haptic effects could be used as touch tones instead of and/or in addition to ring tones.

Figure 11:
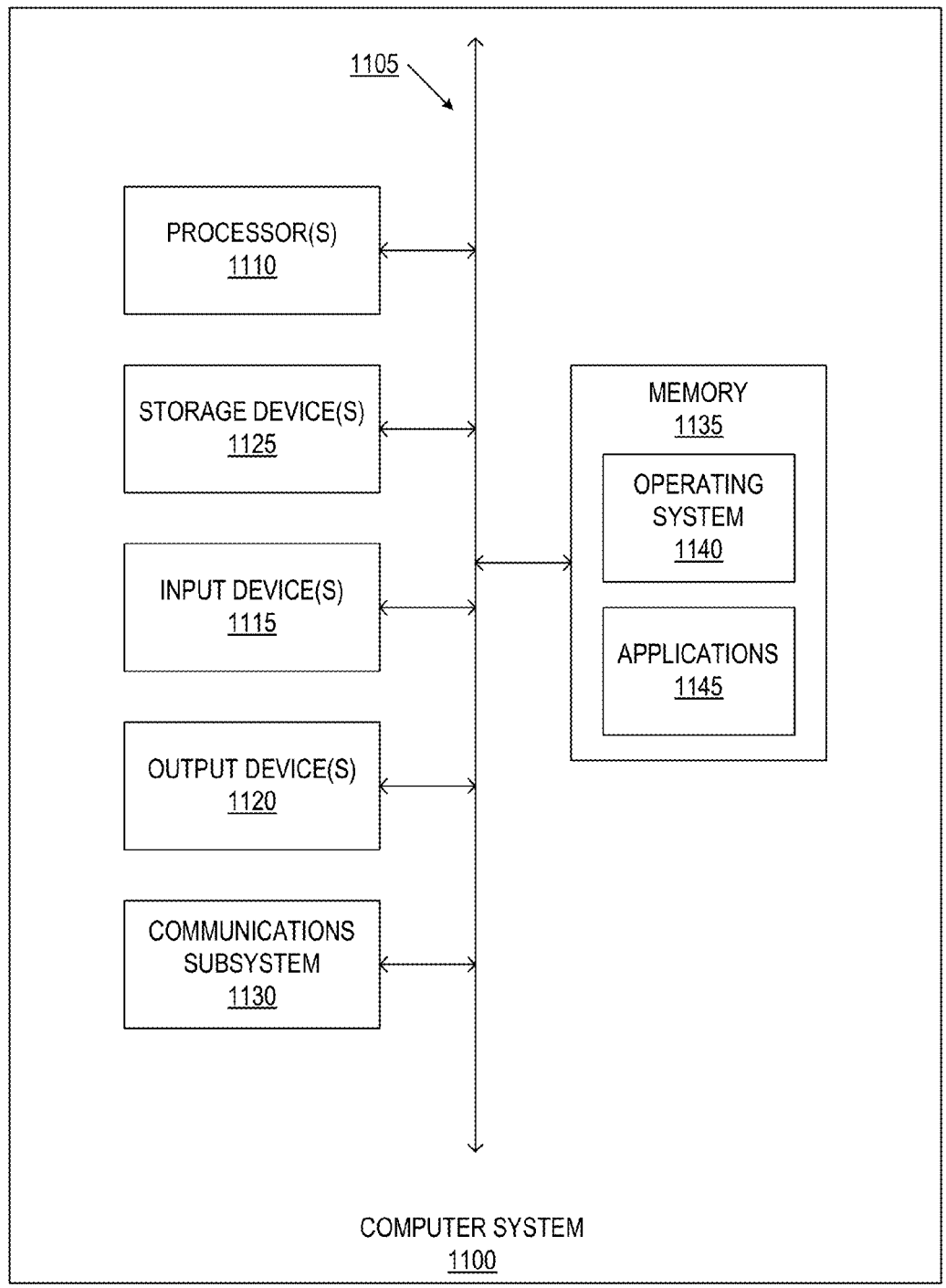
FIG. 11 illustrates an example computing system in which one or more aspects of the disclosure may be implemented.

Having described multiple aspects of integrating sensation functionalities into a mobile device using a haptic sleeve, an example of a computing system in which various aspects of the disclosure may be implemented will now be described with respect to FIG. 11. According to one or more aspects, a computer system as illustrated in FIG. 11 may be incorporated as part of a computing device, which may implement, perform, and/or execute any and/or all of the features, methods, and/or method steps described herein. For example, computer system 1100 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the computer system 1100 is configured to implement the haptic sleeve 100 described above. For example, the computer system 1100 may include one or more components of the haptic sleeve 100 described above, including one or more haptic components, such as components 115, 120, 125, and 130. FIG. 11 provides a schematic illustration of one embodiment of a computer system 1100 that can perform the methods provided by various other embodiments, as described herein, and/or can function as the host computer system, a remote kiosk/terminal, a point-of-sale device, a mobile device, a set-top box, and/or a computer system. FIG. 11 is meant only to provide a generalized illustration of various components, any and/or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a camera, a mouse, a keyboard and/or the like; and one or more output devices 1120, which can include without limitation a display unit, a printer and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise a non-transitory working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 2, 3, 5, 8, and/or 10, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1100) to perform methods in accordance with the disclosure. For example, some or all of the procedures of the described methods may be performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein, for example a method described with respect to FIGS. 2, 3, 5, 8, and/or 10.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communications subsystem 1130 (and/or the media by which the communications subsystem 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
   receiving, via a haptic device, a sensation input captured by one or more haptic components of the haptic device, the sensation input including at least one non-vibratory sensation input;
   capturing image data;
   storing haptic data corresponding to the received sensation input, wherein storing the haptic data includes storing a position value, an intensity value, and a duration value proportional to the received sensation input;
   aligning the captured image data with respect to the received sensation input, wherein the aligning the image data comprises associating specific points of the captured image data with the received sensation input; and
   storing the aligned image data.

2. The method of claim 1, further comprising:
    causing the haptic data corresponding to the received sensation input to be sent to at least one recipient device.

3. The method of claim 2, wherein the haptic data is configured to cause the at least one recipient device to provide haptic feedback based on the received sensation input.

4. The method of claim 1, further comprising:
    causing the haptic data corresponding to the received sensation input to be sent to a recipient device,
    wherein the haptic data is configured to cause the recipient device to provide haptic feedback based on the received sensation input via a second haptic device communicatively coupled to the recipient device.

5. The method of claim 1, wherein the sensation input is received by a computing device, and wherein the haptic device further comprises: a contoured housing that includes the one or more haptic components and is configured to engage with the computing device; and an input/output interface that is configured to communicatively couple the haptic device to the computing device.

6. The method of claim 5, wherein the haptic device is selectively powered by the computing device.

7. The method of claim 1, wherein storing the haptic data corresponding to the received sensation input includes storing haptic data describing at least one non-vibratory sensation.

8. The method of claim 1, further comprising:
    establishing a connection with at least one recipient device;
    causing the haptic data corresponding to the received sensation input to be sent to the at least one recipient device;
    receiving, via the haptic device, additional sensation input captured by the one or more haptic components of the haptic device; and
    streaming, via the established connection, additional haptic data corresponding to the additional sensation input to the at least one recipient device.

9. The method of claim 1, further comprising:
    calculating a vector representing the received sensation input based on the position value, the intensity value, and the duration value associated with the received sensation input.

10. The method of claim 9, further comprising:
    transmitting the calculated vector to a recipient device associated with a second haptic device, wherein the calculated vector enables the second haptic device to reproduce particular haptic effects corresponding to the received sensation input.

11. The method of claim 1, wherein the aligning comprises determining a correlation of one or more pixels of the captured image data to the position value associated with the position value of the received sensation input.

12. The method of claim 1, further comprising:
    providing a user interface that is configured to allow a user to manually align the captured image data with the position value of the received sensation input.

13. The method of claim 12, wherein the user interface is further configured to allow the user to manually align the captured image data with the position value of the received sensation input by one or more of moving and scaling the captured image data.

14. The method of claim 1, wherein the capturing image data comprises capturing image data with a camera.

15. An apparatus comprising:
    a haptic device comprising one or more haptic components, each of the one or more haptic components configured to capture a sensation input;
    at least one processor; and
    memory storing computer-readable instructions that, when executed by the at least one processor, cause the apparatus to:
        receive, from the haptic device, the sensation input, the sensation input including at least one non-vibratory sensation input;
        receive image data;
        store haptic data corresponding to the received sensation input, wherein the haptic data includes a position value, an intensity value, and a duration value proportional to the received sensation input;
        align the captured image data with respect to the received sensation input by associating specific points of the captured image data with the received sensation input; and
        store the aligned image data.

16. The apparatus of claim 15, wherein the memory stores additional computer-readable instructions that, when executed by the at least one processor, further cause the apparatus to:
    cause the haptic data corresponding to the received sensation input to be sent to at least one recipient device.

17. The apparatus of claim 16, wherein the haptic data is configured to cause the at least one recipient device to provide haptic feedback based on the received sensation input.

18. The apparatus of claim 15, wherein the memory stores additional computer-readable instructions that, when executed by the at least one processor, further cause the apparatus to:
    cause the haptic data corresponding to the received sensation input to be sent to a recipient device,
    wherein the haptic data is configured to cause the recipient device to provide haptic feedback based on the received sensation input via a second haptic device communicatively coupled to the recipient device.

19. The apparatus of claim 15, wherein the haptic device further comprises: a contoured housing that includes the one or more haptic components and is configured to engage with the apparatus; and an input/output interface that is configured to communicatively couple the haptic device to the at least one processor.

20. The apparatus of claim 19, wherein the haptic device is selectively powered by the apparatus.

21. The apparatus of claim 15, wherein storing the haptic data corresponding to the received sensation input includes storing haptic data describing at least one non-vibratory sensation.

22. The apparatus of claim 15, wherein the memory stores additional computer-readable instructions that, when executed by the at least one processor, further cause the apparatus to:
    establish a connection with at least one recipient device;
    cause the haptic data corresponding to the received sensation input to be sent to the at least one recipient device;
    receive, via the haptic device, additional sensation input captured by the one or more haptic components of the haptic device; and
    stream, via the established connection, additional haptic data corresponding to the additional sensation input to the at least one recipient device.

23. The apparatus of claim 15, wherein the memory stores additional computer-readable instructions that, when executed by the at least one processor, further cause the apparatus to:
calculate a vector representing the received sensation input based on the position value, the intensity value, and the duration value associated with the received sensation input.

24. The apparatus of claim 23, wherein the memory stores additional computer-readable instructions that, when executed by the at least one processor, further cause the apparatus to:
transmit the calculated vector to a recipient device associated with a second haptic device, wherein the calculated vector enables the second haptic device to reproduce particular haptic effects corresponding to the received sensation input.

25. The apparatus of claim 15, further comprising a camera configured to capture the image data.

26. At least one non-transitory computer-readable medium having computer-executable instructions stored thereon that, when executed, cause at least one computing device to:
receive, via a haptic device, a sensation input captured by one or more haptic components of the haptic device, the sensation input including at least one non-vibratory sensation input;
receive image data;
store haptic data corresponding to the received sensation input, wherein the haptic data includes a position value, an intensity value, and a duration value proportional to the received sensation input;
align the captured image data with respect to the received sensation input by associating specific points of the captured image data with the received sensation input; and
store the aligned image data.

27. The at least one non-transitory computer-readable medium of claim 26, having additional computer-executable instructions stored thereon that, when executed, further cause the at least one computing device to:
cause the haptic data corresponding to the received sensation input to be sent to at least one recipient device.

28. The at least one non-transitory computer-readable medium of claim 27, wherein the haptic data is configured to cause the at least one recipient device to provide haptic feedback based on the received sensation input.

29. The at least one non-transitory computer-readable medium of claim 26, having additional computer-executable instructions stored thereon that, when executed, further cause the at least one computing device to:
cause the haptic data corresponding to the received sensation input to be sent to a recipient device,
wherein the haptic data is configured to cause the recipient device to provide haptic feedback based on the received sensation input via a second haptic device communicatively coupled to the recipient device.

30. The at least one non-transitory computer-readable medium of claim 26, wherein the haptic device further comprises: a contoured housing that includes the one or more haptic components and is configured to engage with the at least one computing device; and an input/output interface that is configured to communicatively couple the haptic device to the at least one computing device.

31. The at least one non-transitory computer-readable medium of claim 30, wherein the haptic device is selectively powered by the at least one computing device.

32. The at least one non-transitory computer-readable medium of claim 26, wherein storing the haptic data corresponding to the received sensation input includes storing haptic data describing at least one non-vibratory sensation.

33. The at least one non-transitory computer-readable medium of claim 26, having additional computer-executable instructions stored thereon that, when executed, further cause the at least one computing device to:
establish a connection with at least one recipient device;
cause the haptic data corresponding to the received sensation input to be sent to the at least one recipient device;
receive, via a haptic device, additional sensation input captured by the one or more haptic components of the haptic device; and
stream, via the established connection, additional haptic data corresponding to the additional sensation input to the at least one recipient device.

34. The at least one non-transitory computer-readable medium of claim 26, having additional computer-executable instructions stored thereon that, when executed, further cause the at least one computing device to:
calculate a vector representing the received sensation input based on the position value, the intensity value, and the duration value associated with the received sensation input.

35. The at least one non-transitory computer-readable medium of claim 34, having additional computer-executable instructions stored thereon that, when executed, further cause the at least one computing device to:
transmit the calculated vector to a recipient device associated with a second haptic device, wherein the calculated vector enables the second haptic device to reproduce particular haptic effects corresponding to the received sensation input.

36. The at least one non-transitory computer-readable medium of claim 26, wherein, the computer-executable instructions stored thereon, when executed, cause the at least one computing device to receive the image data by capturing the image data with a camera.

37. A system comprising:
means for receiving a sensation input captured by one or more haptic components of the haptic device, the sensation input including at least one non-vibratory sensation input; and
means for receiving image data;
means for storing haptic data corresponding to the received sensation input, wherein the haptic data includes a position value, an intensity value, and a duration value proportional to the received sensation input;
means for aligning the captured image data with respect to the received sensation input, wherein the aligning the image data comprises associating specific points of the captured image data with the received sensation input; and
means for storing the aligned image data.

38. The system of claim 37, further comprising:
means for causing the haptic data corresponding to the received sensation input to be sent to at least one recipient device.

39. The system of claim 38, wherein the haptic data is configured to cause the at least one recipient device to provide haptic feedback based on the received sensation input.

40. The system of claim 37, further comprising:
means for causing the haptic data corresponding to the received sensation input to be sent to a recipient device, wherein the haptic data is configured to cause the recipient device to provide haptic feedback based on the received sensation input via a second haptic device communicatively coupled to the recipient device.

41. The system of claim 37, wherein the sensation input is received by a computing device, and wherein the haptic device further comprises: a contoured housing that includes the one or more haptic components and is configured to engage with the computing device; and an input/output interface that is configured to communicatively couple the haptic device to the computing device.

42. The system of claim 41, wherein the haptic device is selectively powered by the computing device.

43. The system of claim 37, wherein means for storing haptic data corresponding to the received sensation input includes means for storing haptic data describing at least one non-vibratory sensation.

44. The system of claim 37, further comprising:
means for establishing a connection with at least one recipient device;
means for causing the haptic data corresponding to the received sensation input to be sent to the at least one recipient device;
means for receiving, via the haptic device, additional sensation input captured by the one or more haptic components of the haptic device; and
means for streaming, via the established connection, additional haptic data corresponding to the additional sensation input to the at least one recipient device.

45. The system of claim 37, further comprising:
means for calculating a vector representing the received sensation input based on the position value, the intensity value, and the duration value associated with the received sensation input.

46. The system of claim 45, further comprising:
means for transmitting the calculated vector to a recipient device associated with a second haptic device, wherein the calculated vector enables the second haptic device to reproduce particular haptic effects corresponding to the received sensation input.

47. The system of claim 37, wherein means for receiving image data comprises means for capturing the image data with a camera.

* * * * *